June 1, 1943.   E. STEADWELL   2,320,481

ELECTRODE HOLDER

Filed Feb. 11, 1942

Inventor:
Elery Steadwell
by Harry E. Dunham
His Attorney.

Patented June 1, 1943

2,320,481

UNITED STATES PATENT OFFICE 2,320,481

ELECTRODE HOLDER

Elery Steadwell, Scotia, N. Y., assignor to General Electric Company, a corporation of New York Application February 11, 1942, Serial No. 430,425

8 Claims. (Cl. 314—68)

My invention relates to electrode holders for high intensity light projectors such as searchlights, for example, and more specifically to an improved electrode feeding mechanism for the negative electrode holders used in such light projectors.

One object of my invention is to provide an improved feeding mechanism by which the electrode in the holder will be held in substantial alinement on a predetermined axis.

For a better understanding of my invention, together with other and further objects thereof, reference is had to the following description taken in connection with the accompanying drawing, and its scope will be pointed out in the appended claims.

Figure 1:
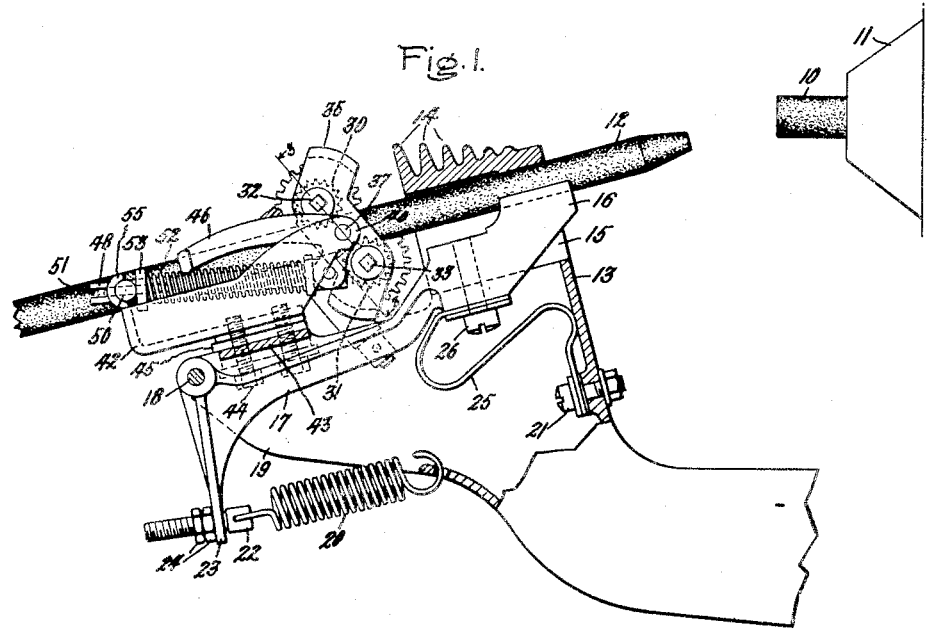
Figure 2:
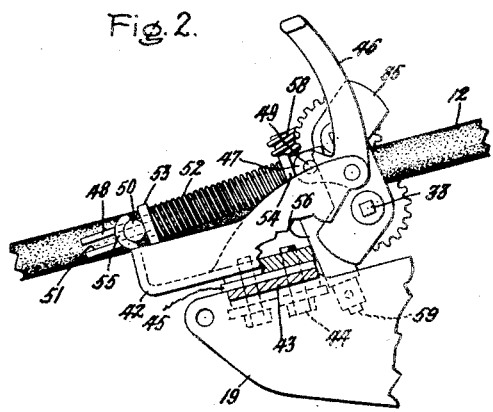
Figure 3:
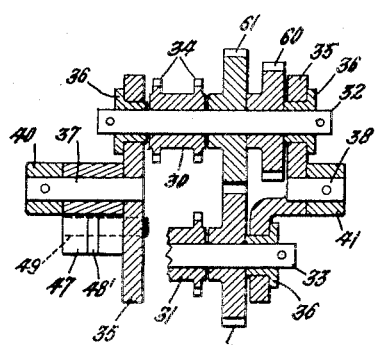
Figure 4:
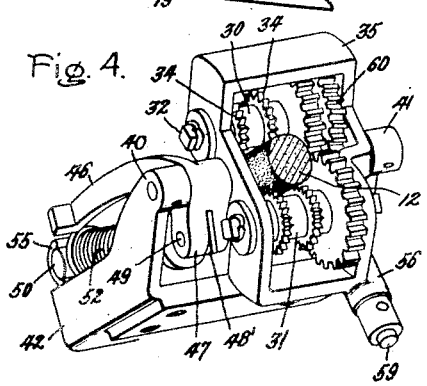

In the accompanying drawing, Fig. 1 is a side elevation partly in cross section of an electrode holder provided with an electrode feeding mechanism built in accordance with my invention; Fig. 2 is a side view of a part of the holder illustrating the feeding mechanism of the holder in its open position; Fig. 3 is an enlarged sectional view looking in the direction of arrows 3—3 in Fig. 1; and Fig. 4 is a perspective front view of the electrode feed mechanism.

Referring to the drawing in detail, Fig. 1 illustrates a positive electrode 10 projecting from the front end of a holder 11 and a negative electrode 12 held in its approximate operating relation to the positive electrode in a holder provided with my improved feeding mechanism. The holder includes a supporting column 13 the end of which is provided with radiating fins 14 and with a slot 15 through which the electrode 12 projects. A brush 16 also projects through this slot, holds the electrode against the upper end of the slot 15 and introduces current to the electrode. The brush 16 is integral with an arm 17 which is pivoted upon a pin 18 extending between and supported by a pair of arms 19 projecting from and integral with opposite sides of the supporting column 13. The arm 17 is urged counterclockwise about this pivot pin 18 by a spring 20 which is hooked to the column 13 at one end and is attached to a screw 22 projecting through an arm 23 integral with and at right angles to the arm 17. Adjustment of the tension of this spring is obtained by adjustment of two nuts 24 on the screw 22. A flexible current conducting strip 25 attached at one end to the column 13 by a screw 21 and attached to the brush 16 at its other end by a suitable screw 26 is provided to carry current from the column to the brush.

Spaced a short distance from the slot and along the predetermined electrode axis is my improved electrode feeding mechanism. This mechanism includes feed rollers 30 and 31 loosely mounted on square shafts 32, 33 so that they may easily move along the shaft. Each of the rollers is provided with two rows of teeth 34 projecting above the surface of the rollers and spaced from each other by a distance slightly less than the diameter of the electrode.

The shafts 32 and 33 are supported by a rectangular frame 35, the ends of the shafts being mounted in bushings 36 mounted for rotation in and projecting through opposite walls of the frame 35. The frame is pivotally supported by pins 37 and 38 upon an axis which is at right angles to and intersects the predetermined axis line along which an electrode is to be moved, this axis being coincident with the center line of slot 15. The shafts 32 and 33 are arranged parallel to each other and to the pivotal axis of the frame 35 in a common plane projecting through the pivotal axis of the frame. They are equally spaced from this pivotal axis by a distance which is greater than the vertical distance from the electrode axis to the axis of the rollers required to produce an engagement between the electrode and the teeth on the rollers. In order to bring about an engagement between the electrode and the rollers, the frame must be moved about its axis from the position vertical to the electrode axis, until the teeth on the feed rollers engage the surface of the electrode.

For the purpose of moving the frame 35 about its pivotal axis the pins 37 and 38 are mounted respectively in arms 40 and 41 of a base 42, the base 42 being mounted upon a shelf 43 connecting the arms 19. The base is attached to this shelf by screws 44, a spacing block 45 of insulating material being used to insulate this base 42 from the supporting shelf 43. A bell crank, provided with a long lever arm 46, is pivoted upon the pin 37 between the frame 35 and the supporting arm 40. This bell crank is provided with a short arm 47 which is substantially at right angles to the lever arm 46 and supports a rod 48 which is provided with a flat head 48' projecting into a slot in the arm 47 and is pivoted to the arm by a pin 49. The rod is slotted at its other end and is supported by a pin 50 projecting through the open ended slot 51 in this end of the pin. A spring 52 provided with suitable end plates 53 and 54 is placed under compression between the pin 50 and the lever arm. The pin 50 is pressed against and is supported within a suitable hood extension 55 of the base 42 and slides in the slot 51 when the rod 48 is moved by the operation of the arm 47. A movement of the lever arm 46 about the pin 37 moves the end of the arm 47 and the pin 49 past the plane projecting through the axis of pin 37 and the axis of pin 50 thereby constituting a toggle mechanism whereby the lever arm 46 is held either in the downward position as shown in Fig. 1 or in its upper position, as shown in Fig. 2, by the pressure of the spring 52. The pin 49 projects beyond the lever 47 and engages one side of the frame (see Fig. 3) whereby the frame 35 is urged about its axis in a clockwise direction when the lever arm 46 is vertical and in a counter-clockwise direction when the lever arm 46 is horizontal. In the position shown in Figs. 1 and 4, the pin 49 urges the frame 35 in a counter-clockwise direction about its pivotal axis thereby effecting an engagement between the rollers 30, 31 and the electrode 12. In the position shown in Fig. 2, the pin 49 moves the frame 35 in a clockwise direction to assume a position at which the plane of the roller axes is at right angles to the axis of the electrode thereby providing a maximum space for the insertion of a new electrode between the rollers and into the slot 15. The frame is held in this position against the force of the spring 52 by the abutment of a sleeve portion 56 against the bottom edge of the base 42.

The rollers 30 and 31 are driven by a worm 58 illustrated in Fig. 2 mounted upon a shaft 59 projecting through the sleeve 56 which is integral with the frame 35. The worm 58 engages a worm gear 60 mounted on the shaft 32 and drives that shaft. A pair of interengaging gears 61 and 62 mounted respectively on the shafts 32 and 33 transmit the motion of the shaft 32 to the shaft 33 so that the rollers 30 and 31 are driven at the same speed. The driving shaft for imparting motion to the shaft 59 is not shown.

In operation, the above feeding mechanism is opened by the upward movement of the lever arm 46. The rollers are thereby moved to a position in which the plane of their axes is vertical to the electrode axis thereby providing a maximum space for the insertion of an electrode between the rollers and into the slot 15 between the brush 16 and the end of the slot. The lever arm 46 is then returned to the horizontal position as shown in Figs. 1 and 4 enabling the spring 51 to move the frame 35 counter-clockwise thereby forcing the rollers to engage the electrode surface.

The teeth on the rollers are pressed into the surface of the electrode at points above and below its maximum width. The rows of teeth automatically tend to take up positions equidistant from the axis of the electrode, the rollers being moved laterally into proper position along their shafts during this process, between the walls of the rectangular supporting frame. The forward end of the electrode is held by the sides of the slot 15 against any substantial horizontal movement from its predetermined axis of movement.

The electrode is maintained upon its predetermined axis in a vertical plane by the vertical pressures of the brush and the rollers resulting from the action of spring 52. The two rollers do not engage the electrode at the same point along the axis because of the movement of the frame about its axis from the vertical position. The rollers engage the electrode at points equally spaced by a relatively short distance on opposite sides of the frame pivotal axis. The two rollers exert equal and opposite vertical pressures and thereby hold the electrode on its axis vertically. A change in diameter of the electrode changes the vertical spacing of the rollers by moving the frame about its pivotal axis, but the vertical pressures exerted by the rollers remain equal and opposite in each instance.

What I claim as new and desire to secure by Letters Patent of the United States, is:

1. In an electrode holder, the combination of a frame pivotally mounted on an axis intersecting and at right angles to the axis along which an electrode is to be fed, feed rollers in said frame mounted on axes parallel to said pivotal axis of said frame and equally spaced from said pivotal axis by a distance sufficient to permit unimpeded access to an electrode along its axis between said rollers when said frame is in a vertical position to said electrode axis, and means for moving said frame about its pivotal axis to effect an engagement between an electrode and said feed rollers.

2. In an electrode holder, the combination of a frame pivotally mounted upon an axis intersecting the axis of an electrode and arranged at right angles to the electrode axis, a pair of feed rollers mounted in said frame and spaced from each other, means for moving said frame about its axis to force said rollers into engagement with the surface of an electrode during operation, and means for holding said frame in a position vertical to said electrode axis during the insertion of a new electrode to provide unimpeded access to said electrode.

3. In an electrode feeding mechanism, the combination of a frame pivotally mounted on an axis intersecting and at right angles to the axis along which an electrode is to be moved, a pair of shafts mounted in said frame parallel to the said pivotal axis of said frame and equally spaced from said pivotal axis, a roller mounted on each of said shafts and movable along said shafts provided with two rows of teeth spaced from each other by a distance less than the maximum width of the round electrode which is to be engaged, and means for moving said frame about its pivot to effect equal and opposite pressures upon said electrode in a vertical plane.

4. In an electrode feeding mechanism, the combination of a frame pivotally mounted on an axis intersecting and at right angles to the axis along which an electrode is to be moved, a pair of shafts mounted in said frame parallel to the said pivotal axis of said frame and equally spaced from said pivotal axis, a roller mounted on each of said shafts and movable along said shafts respectively provided with means to engage a round electrode at two points spaced from each other by a distance less than the maximum width of said electrode, a spring operated over-center device provided with an operating lever arranged to move said frame in one direction about its pivotal axis to urge said rollers into engagement with an electrode and in another direction to release said electrode, and stop means to hold said frame in a position most favorable to the release of said electrode.

5. In an electrode feeding mechanism, the combination of a frame pivotally mounted on an axis intersecting and at right angles to the axis along which an electrode is to be moved, a pair of shafts mounted in said frame parallel to the said pivotal axis of said frame and equally spaced from said pivotal axis, a roller mounted on each of said shafts and movable along said shafts respectively provided with means to engage a round electrode at two points spaced from each other by a distance less than the maximum width of said electrode, a spring operated over-center device provided with an operating lever arranged to move said frame in one direction about its pivotal axis to urge said rollers into engagement with an electrode and in another direction to release said electrode, and stop means to hold said frame in a position vertical to the axis of said electrode thereby providing a maximum space for the insertion or removal of an electrode into operating position.

6. In an electrode feeding mechanism, the combination of a frame pivotally mounted on an axis intersecting and at right angles to the axis along which an electrode is to be moved, a pair of shafts mounted in said frame parallel to the said pivotal axis of said frame and equally spaced from said pivotal axis, a roller mounted on each of said shafts and movable along said shafts respectively provided with two spaced rows of teeth arranged to engage a round electrode at points spaced from each other by a distance less than the maximum width of said electrode, a spring toggle mechanism arranged to move said frame about its pivot to effect an engagement between said rollers and an electrode placed between said rollers, stop means, and a lever arranged to move said toggle mechanism to an over-center position to urge said frame in an opposite direction about its pivot against said stop means in which position said rollers are out of engagement with said electrode and said electrode may be freely moved along its predetermined axis.

7. In an electrode holder, the combination of a supporting column, a guide slot projecting through the end thereof and arranged to guide an electrode in a horizontal plane, a brush in said slot urged toward one end of said slot to engage an electrode and to press it against one end of said slot, a frame mounted upon said column and pivoted upon an axis spaced from said column, said axis intersecting the predetermined axis along which an electrode is to be moved and arranged at right angles to the said predetermined axis, a pair of feed rollers mounted in said frame and movable horizontally, said feed rollers being spaced from each other sufficiently to permit free passage of an electrode between said rollers along the predetermined axis of movement, and means for urging said rollers against an electrode moving along said predetermined axis whereby said feed rollers move horizontally to engage said electrode at equally spaced points and exert equal and opposite pressures upon said electrode in a vertical plane to hold it on its predetermined electrode axis.

8. In an electrode holder, the combination of a supporting column provided with a slot arranged to guide an electrode upon a predetermined axis in a horizontal plane, a brush in said slot urged to move toward one end of said slot and arranged to clamp an electrode to one end of said slot, an electrode feeding mechanism mounted on said supporting column and spaced from said brush along the predetermined axis of movement of the electrode including a frame pivotally mounted upon an axis intersecting said predetermined electrode axis and at right angles thereto, a pair of shafts mounted in said frame parallel to said pivotal axis, rollers mounted on said shafts and respectively movable thereon and arranged to engage said electrode respectively at two points about its axis, and means for moving said frame about its axis whereby said feeding rollers move laterally to engage the electrode at equally spaced points in response to its horizontal positioning by the side walls of said slot and to effect equal and opposite vertical pressures tending to maintain said electrode vertically upon its predetermined axis said rollers being movable in a vertical plane to allow for variations in the diameter of said electrodes.

ELERY STEADWELL.